United States Patent [19]

Miers et al.

[11] Patent Number: 5,348,663
[45] Date of Patent: Sep. 20, 1994

[54] CONTROL OF BROMINATION OF DRINKING WATER

[75] Inventors: Gary L. Miers, Poland Springs; David G. Allen, Raymond; Bruce G. Merrill, Windham, all of Me.

[73] Assignee: Howell Laboratories, Inc., Bridgton, Me.

[21] Appl. No.: 110,566

[22] Filed: Aug. 23, 1993

[51] Int. Cl.$^5$ ............................ C02F 1/50; C02F 1/76
[52] U.S. Cl. ...................................... 210/739; 210/85; 210/94; 210/138; 210/754
[58] Field of Search .............. 210/739, 746, 753, 754, 210/85, 94, 96.1, 138, 139, 143, 97

[56] References Cited

U.S. PATENT DOCUMENTS

| | | | |
|---|---|---|---|
| 3,528,545 | 9/1970 | Frazel et al. | 210/138 |
| 3,804,253 | 4/1974 | Wellman et al. | 210/138 |
| 3,867,290 | 2/1975 | Mackey | 210/138 |
| 4,224,154 | 9/1980 | Steininger | 210/139 |
| 4,260,587 | 4/1981 | Braden | 210/169 |
| 4,323,092 | 4/1982 | Zabel | 137/5 |
| 4,657,670 | 4/1987 | Newton | 210/85 |
| 4,688,699 | 8/1987 | Goudy, Jr. et al. | 210/138 |
| 4,997,563 | 3/1991 | Jones | 210/264 |

*Primary Examiner*—Neil McCarthy
*Attorney, Agent, or Firm*—Samuels, Gauthier & Stevens

[57] ABSTRACT

A process of and apparatus for determining when the effective bromine contained in a polybromide impregnated resin cartridge used in a water disinfection system is depleted. The bromine content of the supply water is measured. When the bromine content falls below a desired level, a comparative circuit is actuated to initiate flow of the supply water through a bromine cartridge assembly. At the same time, a timing cycle is initiated. The bromine content is continuously monitored and if it does not rise above the desired level during the life of the timing cycle then an signal is output to indicate that the bromine cartridge is depleted.

4 Claims, 1 Drawing Sheet

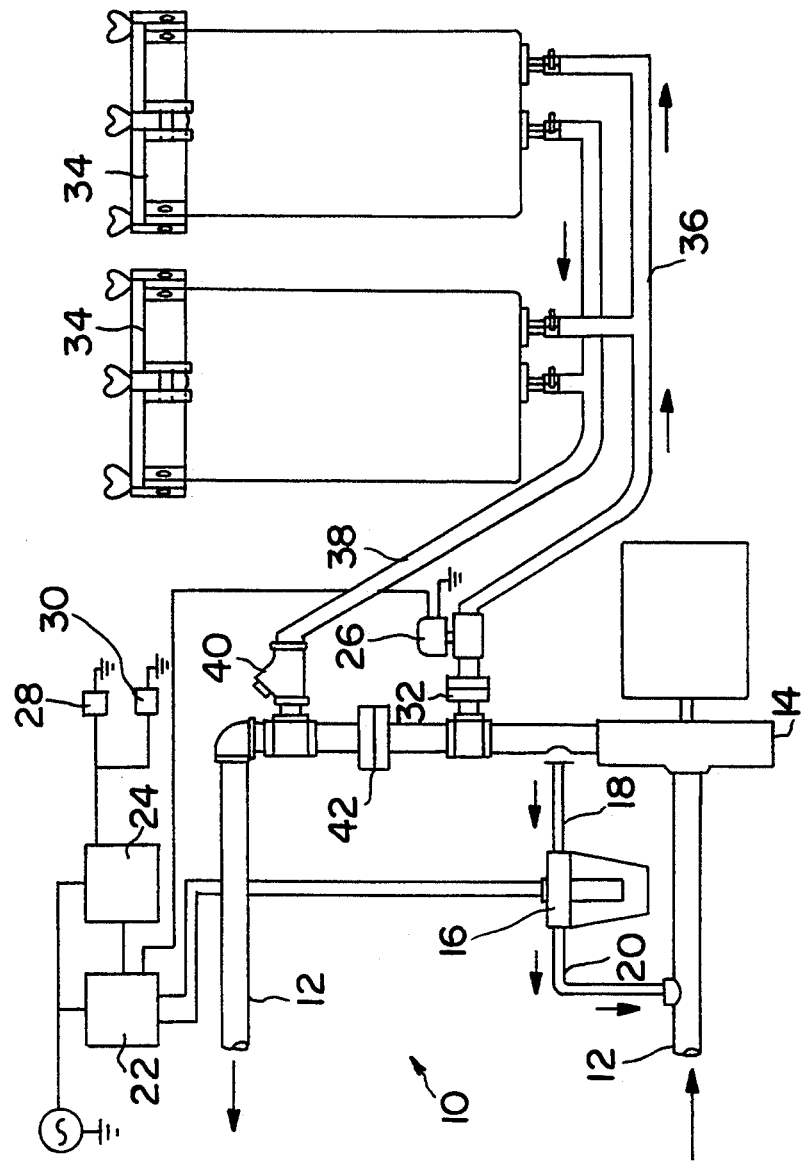

CONTROL OF BROMINATION OF DRINKING WATER

BACKGROUND OF THE INVENTION

Disinfection of water is required to insure the destruction of pathogenic organisms. Maintenance of a halogen residual in the water is the usual method of guarding against sanitary defects or accidents that may occur during the production, handling, storage and distribution of water. The absence of a free available chlorine (FAC) or total bromine residual (TBR) in a water system may indicate contamination. The presence of a halogen residual provides an indication that the water is free of pathogenic organisms. A generally accepted rule is an FAC or TBR of 0.2 parts per million (ppm) after 30 minutes contact time. It is also generally accepted that free halogen residual concentrations as high as 2.0 ppm do not cause objectionable tastes and odors. These values of FAC and TBR, 0.2 ppm and 2.0 ppm, thus represent typically encountered halogen application levels, although special circumstances can demand higher levels.

One of the methods by which bromine is introduced into a water system is via a cartridge containing a polybromide impregnated resin. The water being treated is allowed to flow through the cartridge. Ionic action between the water and the resin allows bromine to elute off the resin and enter the water. The rate at which the bromine elutes into the water is a function of the water temperature, water flow rate through the cartridge and the cartridge life cycle age. Consequently, the effective life cycle of a cartridge is also a function of the same variables. Currently, bromination systems do not accurately determine when the end of the effective life of a cartridge is reached. Estimates based on water volume and temperature are used to determine if a cartridge is at the end of its life cycle. In most cases, these estimates are inaccurate and many cartridges are discarded when they are only 50–75% into their life cycle. Also, with current systems, the cartridge cannot be viewed to see how far down on the cartridge the interface between bromine rich resin (reddish color) and bromine depleted resin (grayish color) is located without shutting the system down and disassembling the cartridge housing.

The invention broadly embodies a system and method for accurately determining when the life cycle of a bromine cartridge is completed.

In a preferred embodiment, the bromine content of the supply water is measured. When the bromine content remains below a pre-determined level over a pre-determined period of time, a signal is output from the sensoring device indicating that a new cartridge should be placed on line.

In a preferred embodiment of the invention, a two pole halogen, e.g. bromine, sensor is placed into a water stream to sense the presence or absence of a designated quantity of bromine in the stream. A voltage potential between the two poles of the sensor is a function of the bromine level in the water stream. The absence of the designated bromine level in the water will cause the potential between the poles of the sensor to change causing the circuitry in a controller to energize a pre-set timer and actuate a valve. The actuated valve will open and allow water to flow through a cartridge containing polybromide impregnated resin. Ionic action between the water and the resin will allow bromine to elute off the resin and enter the water stream. A pump continually circulates the water through the system and over the sensor. If the level of bromine is not increased to the designated level within the pre-set time of the energized timer, then the effective bromine contained in the cartridge is depleted. When these two conditions are met (timing out of the timer and deficient bromine level), circuitry in the controller will energize an indicating device or devices.

In the case where multiple polybromide impregnated resin cartridges are used in the system, they are housed in clear vessels. These clear vessels will allow an operator to observe visually the polybromide impregnated resin cartridge without shutting the system down. By observing how far down on the cartridge the interface between bromine rich resin (reddish color) and bromine depleted resin (grayish color) is located on each cartridge, the operator can choose to replace the most depleted cartridge.

BRIEF DESCRIPTION OF THE DRAWING

The drawing is a process flow schematic of a system embodying the invention.

DESCRIPTION OF THE PREFERRED EMBODIMENT(S)

Referring to the Figure, a system embodying the invention is shown generally at 10 and comprises a feed conduit 12 carrying the water to be brominated and may, in practice, be the main line or a branch line. A pump 14 is located in the conduit 12 to provide a sufficient and/or regulated flow of water in the conduit 12. A regulated supply of water to be sensed for bromine content is supplied to a bromine sensor assembly 16 from the conduit 12 via a conduit 18 which is teed into conduit 12 downstream of the pump 14. The bromine sensor assembly 16 may be any type that has an electrical signal as an output, preferably, Prominent Fluid Controls Model Dulcotest Sensor. The supply of water sensed for bromine content is returned to conduit 12 via a conduit 20 which enters the conduit 12 upstream of the pump 14. However, any configuration that insures that water to be brominated flows across the bromine sensor assembly 16 is suitable.

The bromine sensor assembly's 16 electrical output signal is routed to a comparative circuit 22, such as Lakewood Instruments, Inc., Model 898. The output of the comparative circuit 22 is routed to both a timer circuit 24 and an actuator of a valve assembly 26. The output of the timing circuit 24 is routed to one or more indicating devices 28 and 30. For example a visual indicating device can be any device that generates a visually observed signal (light bulb, LCD, etc.). An audible indicating device can be any device that generates an audibly observed signal (bell, buzzer, etc.).

The valve assembly 26 is teed into the conduit 12 downstream of where conduit 18 is teed into the conduit 12. There can be an orifice 32 placed between conduit 12 and the input side of the valve body of the valve assembly 26 to regulate the flow. The water output from the valve body of the valve assembly 26 is then routed to the input side of the housings 34 containing the polybromide impregnated resin cartridges (not shown) via the conduit 36. The housings 34 are made from a clear material. The water output from the output side of the housings 34 flows through the conduit 38 back to and teed into conduit 12 downstream of where the valve assembly 26 is teed into conduit 12. There can be a check valve 40 located between the output of the housings 34 and the conduit 12 to prevent back flushing of the housings 34. There can also be an orifice 42 placed in the conduit 12 between the valve assembly 26 and where the conduit 38 is teed into the conduit 12 to regulate flow.

In the operation of the invention, the system water is pumped to and from a storage tank (not shown) through the conduit 12 by the pump 14. Part of the water is bypassed via conduit 18, the bromine sensor assembly 16 and back to the conduit 12 through the conduit 20. The bromine sensor assembly 16 sends a voltage signal, as a function of bromine content in the water, to the comparative circuit 22. For purposes of the preferred embodiment, it is desired to maintain the bromine content of the water at 2 ppm or greater. For example, if the bromine content read 1.8 ppm, a signal having a value of 0.027 volts would be the output. This signal indicates that the bromine level in the water is below a designated level. The comparative circuit 22 energizes both the timer circuit 24 and the actuator of valve assembly 26. When the actuator of valve assembly 26 is energized, it opens the valve allowing water flow through the conduit 36 and into the housings 34, thus allowing water flow through the polybromide impregnated resin cartridges. Ionic action between the water and the resin will allow bromine to elute from the resin into the water. The water then leaves the housings 34 via conduit 38 and re-enters conduit 12 to return to the storage tank.

Pump 14 continually circulates the water through the system and through the bromine sensor assembly 16. If the level of bromine in the water is not increased to the designated level within the pre-set time of the energized timing circuit 24, then the effective bromine contained in the cartridges is depleted. When these two conditions are met (timing out of the timer circuit 24 and deficient bromine level), the timer circuit 24 will energize indicating devices 28 and 30.

For example, the flow rate through the conduit could be 15 gpm and the bypass flow rate through the bromine sensor assembly 16 could be 0.5 gpm with the flow rate through the conduits 36 and 38 being 1.0 gpm. For the example described, if the bromine content remains below the pre-determined level for say 90 minutes, then the alarm devices will be actuated. Stated otherwise, once the timing cycle in the timer circuit 24 has been actuated, if the signal from the comparative circuit 22 during the life of the timing cycle continues to reflect that the bromine content is below the predetermined level, then the alarm devices will be actuated.

When more than one housing 34 is used, the operator can see through the clear walls of the housings 34 and choose to replace the most depleted cartridge by observing how far down on the cartridge the interface is between bromine rich resin (reddish color) and bromine depleted resin (grayish color).

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. A method for determining completion of a life cycle of at least one cartridge containing a polybromide impregnated resin used for introducing bromine into water for disinfection of the water comprising:
   placing a cartridge containing a polybromide impregnated resin in fluid flow communication with a supply of water to be disinfected;
   measuring the content of bromine in the water;
   initiating a timing cycle when the bromine content in the water is below a desired level;
   measuring the bromine content of the water during the duration of the timing cycle,
   discontinuing the timing cycle if the bromine content rises above the desired level; and
   outputting an alarm signal if the bromine content remains below the desired level during the timing cycle, said alarm signal indicating that the life cycle of the cartridge containing the polybromide impregnated resin is completed.

2. The system of claim 1 comprising housings containing at least two cartridges containing polybromide impregnated resin.

3. The system of claim 2 wherein the housing walls are clear such that the interface between a bromine depleted portion of the cartridge and a bromine rich portion of the cartridge can be visually observed.

4. The system of claim 3 which includes:
   means to place said housings in communication with the supply of water when the timing cycle is initiated.

* * * * *